United States Patent
Ishihara et al.

(10) Patent No.: US 8,875,214 B2
(45) Date of Patent: Oct. 28, 2014

(54) TELEVISION

(71) Applicant: Funai Electric Co., Ltd., Daito (JP)

(72) Inventors: Hidetoshi Ishihara, Daito (JP);
Norihiro Higashi, Daito (JP); Keita Nishimura, Daito (JP); Kentaro Eto, Daito (JP); Keisuke Tsukamoto, Daito (JP)

(73) Assignee: Funai Electric Co., Ltd., Osaka (JP)

(*) Notice: Subject to any disclaimer, the term of this patent is extended or adjusted under 35 U.S.C. 154(b) by 0 days.

(21) Appl. No.: 13/760,217

(22) Filed: Feb. 6, 2013

(65) Prior Publication Data

US 2013/0208185 A1    Aug. 15, 2013

(30) Foreign Application Priority Data

Feb. 14, 2012  (JP) ................................. 2012-029972

(51) Int. Cl.
*H04N 7/173* (2011.01)
*G09G 5/00* (2006.01)
*H04N 5/44* (2011.01)

(52) U.S. Cl.
CPC ............... *H04N 5/44* (2013.01); *G09G 5/006* (2013.01); *G09G 2370/12* (2013.01); *G09G 2360/02* (2013.01); *G09G 2370/022* (2013.01)
USPC ............... 725/133; 725/38; 725/92; 725/115; 725/145; 725/153; 348/552

(58) Field of Classification Search
USPC ..................... 725/38, 92, 115, 133, 145, 153; 348/552
See application file for complete search history.

(56) References Cited

U.S. PATENT DOCUMENTS

| 2005/0076371 | A1 | 4/2005 | Nakamura |
| 2009/0248924 | A1 | 10/2009 | Melin |
| 2010/0060549 | A1 | 3/2010 | Tsern |
| 2010/0109795 | A1 | 5/2010 | Jones et al. |
| 2010/0146527 | A1* | 6/2010 | Craib et al. ................. 725/5 |
| 2012/0050012 | A1* | 3/2012 | Alsina et al. ............. 340/10.1 |

FOREIGN PATENT DOCUMENTS

JP    2005-73145 A    3/2005

OTHER PUBLICATIONS

Official Communication issued in corresponding European Patent Application No. 13155089.9, mailed on Jun. 11, 2013.

* cited by examiner

*Primary Examiner* — Pankaj Kumar
*Assistant Examiner* — Charles N Hicks
(74) *Attorney, Agent, or Firm* — Keating & Bennett, LLP

(57) ABSTRACT

In a television, which can be connected to a portable information terminal, it is possible to display video based on the data of a multimedia file stored on a storage medium even in cases where there is no built-in decoder. In cases where a TV itself does not possess a decoder which can decode the data of a multimedia file selected by the user from the multimedia files stored on the USB memory, the CPU of the TV transmits to a smartphone the data of the selected multimedia file and a decoding request command to request that the data be decoded, thus receiving a video signal and/or an audio signal obtained by various types of decoders of the smartphone. Consequently, the CPU of the TV can output video and/or audio to a display unit and a speaker on the basis of the data of the selected multimedia file.

4 Claims, 6 Drawing Sheets

FIG. 5

Multimedia File List Screen 60

• Please select a multimedia file to be reproduced with the cross keys on the remote controller.

| File Name | Format |
|---|---|
| File 1 | WMV |
| File 2 | MP 4 |
| File 3 | MP 3 |
| File 4 | AVI |
| ... | ... |

FIG. 6

Multimedia File List Screen 60'

- Please select a multimedia file to be reproduced with the cross keys on the remote controller.

| File Name | Format |
|---|---|
| File1 | WMV |
| File2 | MP4 |
| File3 | MP3 |
| File4 | AVI |
| ... | ... |

# TELEVISION

BACKGROUND OF THE INVENTION

1. Field of the Invention

The present invention relates to a television which can be connected to a portable information terminal such as a smartphone.

2. Description of the Related Art

There have traditionally been televisions which have a connection terminal for a storage medium such as a USB (universal serial bus) memory and which can receive a multimedia file (e.g., a file that stores compressed moving image data and compressed audio data) stored on the storage medium and reproduce the content of the multimedia file.

Furthermore, there has recently been an increase in televisions which can display video and audio based on video signals and audio signals received from a portable information terminal such as a smartphone by being connected to the portable information terminal via an MHL (mobile high-definition link) cable. Here, MHL refers to the standards of an interface designed for a portable information terminal for transferring high-speed video and audio which is used to connect the portable information terminal and a display device such as a television, and an existing micro-USB connector can be used for the portable information terminal as the connector of the portable information terminal.

Moreover, portable information terminals have been known in which an analog video signal received from the television via a connector is demodulated (converted) into a digital video signal, after which video based on the digital video signal is displayed on the display thereof, or the digital video signal is saved on a server at the base station. See, for example, Japanese Patent Application Laid-Open Publication No. 2005-73145.

SUMMARY OF THE INVENTION

The following problem with the aforementioned conventional televisions capable of receiving a multimedia file stored on a storage medium has been discovered. Specifically, there has recently been an increase in the data format types of multimedia files. In concrete terms, the data formats of files for storing compressed moving image data include data formats such as MP4 (MPEG-4 unit 14), WMV (Windows media video), and AVI (audio video interleaving), and the data formats of files for storing compressed audio data include data formats such as MP3 (MPEG audio layer-3), for example. Mounting decoders of numerous types on a television in order to handle multimedia files in data formats of such numerous types results in an increase in the manufacturing cost of televisions. Note that the aforementioned problem cannot be eliminated with the invention described in Japanese Patent Application Laid-Open Publication No. 2005-73145.

Accordingly, preferred embodiments of the present invention provide a television which can display video based on data of a multimedia file stored on a storage medium even in cases where the television does not possess a decoder capable of decoding the data of the multimedia files stored on the storage medium.

According to a preferred embodiment of the present invention, a television which can be connected to a portable information terminal includes an information terminal-use transmission and reception unit arranged to perform transmission and reception of data with the portable information terminal; a storage medium-use reception unit arranged to receive data from a storage medium; a display unit arranged to display video based on a video signal received from the portable information terminal by the information terminal-use transmission and reception unit, a determination unit arranged to determine whether or not the data of multimedia files stored on the storage medium is decodable with a decoder of the portable information terminal; a selection unit arranged to select a multimedia file which will become the object of reproduction from among the multimedia files storing data which has been determined to be decodable by the determination unit; a multimedia file transmission and reception control unit arranged and programmed to receive the data of the multimedia file selected with the use of the selection unit from the storage medium by using the storage medium-use reception unit and also to transmit the data of the received multimedia file and a decoding request command to request the decoding of the data of the multimedia file to the portable information terminal by using the information terminal-use transmission and reception unit; and a signal reception control unit arranged and programmed to receive a video signal and/or an audio signal obtained as a result of the decoder of the portable information terminal decoding the data of the multimedia file from the portable information terminal by using the information terminal-use transmission and reception unit.

The determination unit preferably requests to the portable information terminal the transmission of decodable format information indicating data format types that are decodable with the decoder of the portable information terminal and determines whether or not the data of the multimedia files stored on the storage medium is decodable with the decoder of the portable information terminal on the basis of the decodable format information transmitted from the portable information terminal in response to the request.

The television according to a preferred embodiment of the present invention also includes a selection prompt unit that prompts the user to select a multimedia file which will become the object of reproduction by using the selection unit and displaying on the display unit only the multimedia files storing the data which has been determined to be decodable by the determination unit out of the multimedia files stored on a storage unit.

The storage unit preferably is a portable memory.

With the television according to a preferred embodiment of the present invention described above, even in cases where a television itself does not include a decoder which can decode the data of a multimedia file selected by the user from the multimedia files stored on a storage medium, it is possible to transmit to a portable information terminal the data of the selected multimedia file and a decoding request command to request that the data be decoded and to receive a video signal and/or an audio signal obtained by the decoder of the portable information terminal. Therefore, video and/or audio based on the data of the selected multimedia file can be output to the display unit and/or the speaker. Consequently, there is no longer any need to mount decoders of many types on the television itself in order to handle the multimedia files in many types of data format which may possibly be stored on the storage medium, so the cost required for mounting decoders including license fees can be reduced.

Furthermore, with a preferred embodiment of the present invention, the user can use the selection unit to select only the multimedia file(s) storing the data that is decodable with the decoder of the portable information terminal from among the multimedia files stored on the storage medium, so it is possible to prevent the user from selecting a multimedia file storing data that is not decodable with the decoder of the portable information terminal.

With a preferred embodiment of the present invention, it is possible to accurately determine whether or not the data of the multimedia files stored on the storage medium is decodable with the decoder of the portable information terminal.

With a preferred embodiment of the present invention, it is possible to display only the multimedia files storing the data that is decodable with the decoder of the portable information terminal out of the multimedia files stored on the storage medium and to prompt the user to select a multimedia file which will become the object of reproduction, so it is possible to prevent the user from selecting a multimedia file storing the data that is not decodable with the decoder of the portable information terminal in a more reliable manner.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a diagram showing an example of the display on a screen of a list of multimedia files in the television shown in FIG. 1.

FIG. 6 is a diagram showing an example of the display on a screen of a list of multimedia files in the television according to a second preferred embodiment of the present invention.

DETAILED DESCRIPTION OF PREFERRED EMBODIMENTS

Preferred embodiments of the present invention will be described below with reference to figures. Note that the preferred embodiments described below are not meant to encompass the present invention, and the present invention is not limited only to the following preferred embodiments.

Figure 1:
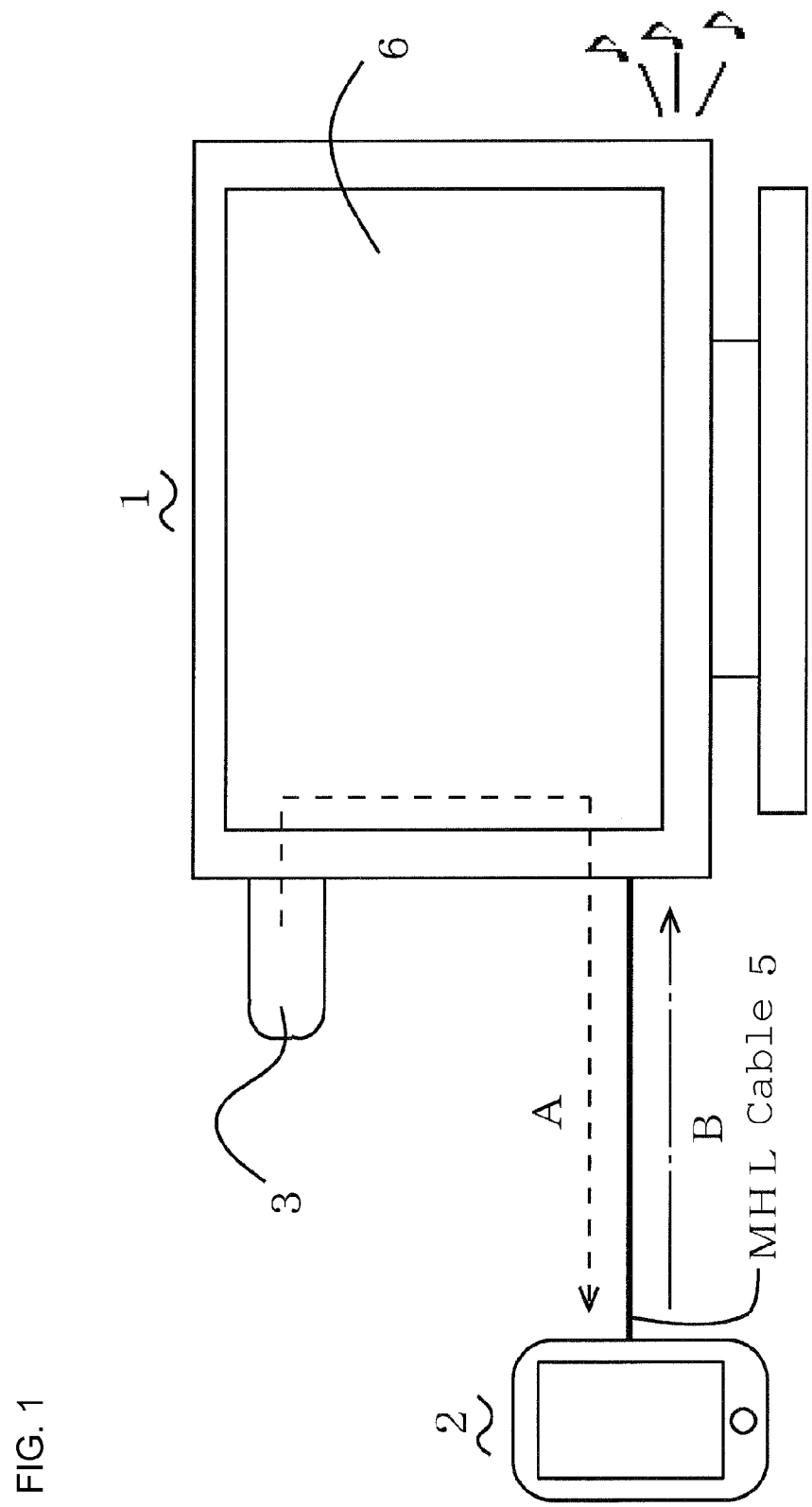
FIG. 1 is an explanatory diagram showing the flow of data in cases where a smartphone and a USB memory are connected to the television according to a first preferred embodiment of the present invention.

FIG. 1 shows the television (hereinafter referred to as TV) according to a first embodiment of the present invention. This TV 1 can be connected to a smartphone 2 (portable information terminal) via an MHL (mobile high-definition link) cable 5. Furthermore, the TV 1 includes a USB (universal serial bus) connector 14*a* (see FIG. 2) and can include a USB memory 3 (storage medium, portable memory) connected thereto by using the USB connector 14*a*.

Although the detail will be described later, the TV 1 can transmit to the smartphone 2 the data of a multimedia file selected by the user from the multimedia files stored on the USB memory 3 and a decoding request command to request that this data be decoded as indicated by the dashed arrow A in FIG. 1. Moreover, this TV 1 can receive a video signal and an audio signal obtained by various types of decoders of the smartphone 2 as indicated by the dashed-dotted arrow B in FIG. 1. Then, video and/or audio based on the data of the multimedia file selected by the user can be output to a display unit 6 (e.g., liquid crystal display panel) and/or a speaker 21 (see FIG. 2).

Figure 2:
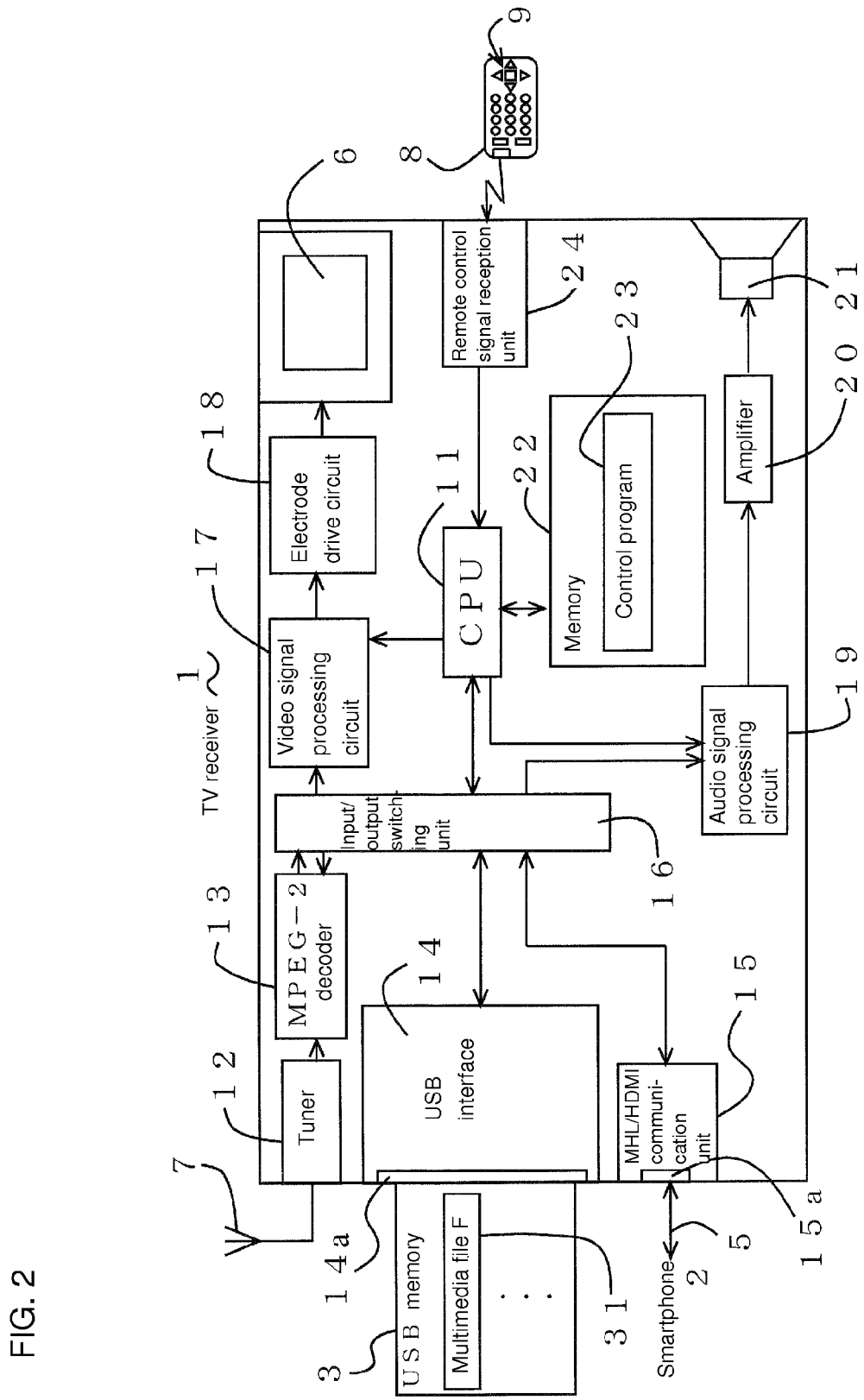
FIG. 2 is an electrical block configuration diagram of the television shown in FIG. 1.

Next, the electrical block configuration of the TV 1 will be described with reference to FIG. 2. The TV 1 includes a CPU 11 that performs control of the device overall. The TV 1 also includes a tuner 12 arranged to receive digital television broadcast signals (transport stream) via an antenna 7 and an MPEG-2 decoder 13 that generates a video stream, an audio stream, and a data stream by decoding packets in the transport stream received by the tuner 12.

In addition, the TV 1 includes a USB interface 14 (storage medium-use reception unit) which is an interface circuit arranged to perform transmission and reception of data with the USB memory 3. The USB interface 14 is provided with the USB connector 14*a*. Furthermore, the TV 1 includes an MHL/HDMI communication unit 15 (information terminal-use transmission and reception unit) which includes an interface circuit having both the function of performing communications with the smartphone 2 in accordance with the MHL standards and the function of performing communications with AV (audio/visual) equipment in accordance with the HDMI (high-definition multimedia interface) standards. The TV 1 performs transmission and reception of data with the smartphone 2 by using the MHL/HDMI communication unit 15. The MHL/HDMI communication unit 15 is provided with an HDMI connector 15*a* to which one end of the MHL cable 5 or an HDMI cable is connected.

Moreover, the TV 1 includes an input/output switching unit 16, and the input/output switching unit 16 selectively outputs a video stream generated by the MPEG-2 decoder 13 or a video signal received by the MHL/HDMI communication unit 15 to a video signal processing circuit 17 in accordance with the control performed by the CPU 11. In addition, the input/output switching unit 16 selectively outputs an audio stream generated by the MPEG-2 decoder 13 or an audio signal received by the MHL/HDMI communication unit 15 to an audio signal processing circuit 19 in accordance with the control performed by the CPU 11. Furthermore, the input/output switching unit 16 outputs the data of a multimedia file (multimedia F) 31 that is received by using the USB interface 14 to the MPEG-2 decoder 13 or to (the smartphone 2 via) the MHL/HDMI communication unit 15 for the purpose of decoding in accordance with the control performed by the CPU 11.

Moreover, the TV 1 includes the video signal processing circuit 17 which subjects a video signal that is input via the input/output switching unit 16 to various types of processing such as image processing and which reproduces a video signal that has undergone such processing, an electrode drive circuit 18 which drives an electrode for display on the basis of the video signal received from the video signal processing circuit, and the display unit (e.g., liquid crystal panel) 6 which displays video on the basis of the video signal that has undergone the video signal processing by the video signal processing circuit 17.

In addition, the TV 1 includes the audio signal processing circuit 19 which subjects an audio signal that is input via the input/output switching unit 16 to various types of audio signal processing (including D/A conversion processing when the input audio signal is a digital-form audio signal), an amplifier 20 which amplifies the audio signal that is output from the audio signal processing circuit 19, and the built-in speaker 21 which outputs audio by being driven by the audio signal (drive signal) amplified by the amplifier 20.

The TV 1 includes a remote controller 8 used for various types of command operation, and a remote control signal reception unit 24 arranged to receive a remote control signal from the remote controller 8 is provided of the main body of the TV 1. The remote controller 8 includes cross keys 9

(selection unit) including upward, downward, leftward, and rightward movement keys and a decision key. The cross keys 9 are used in a user operation to select a multimedia file which will become the object of reproduction from among the multimedia files 31 stored on the USB memory 3. Furthermore, the TV 1 includes a memory 22 which stores data and various types of programs including a control program 23 to control the TV 1 overall. The control program 23 and the CPU 11 correspond to the determination unit, the multimedia file transmission and reception control unit, and the signal reception control unit in the claims. Moreover, the control program 23, the CPU 11, and a multimedia file list screen (see FIG. 5) which will be described later correspond to the selection prompt unit in the claims.

Figure 3:
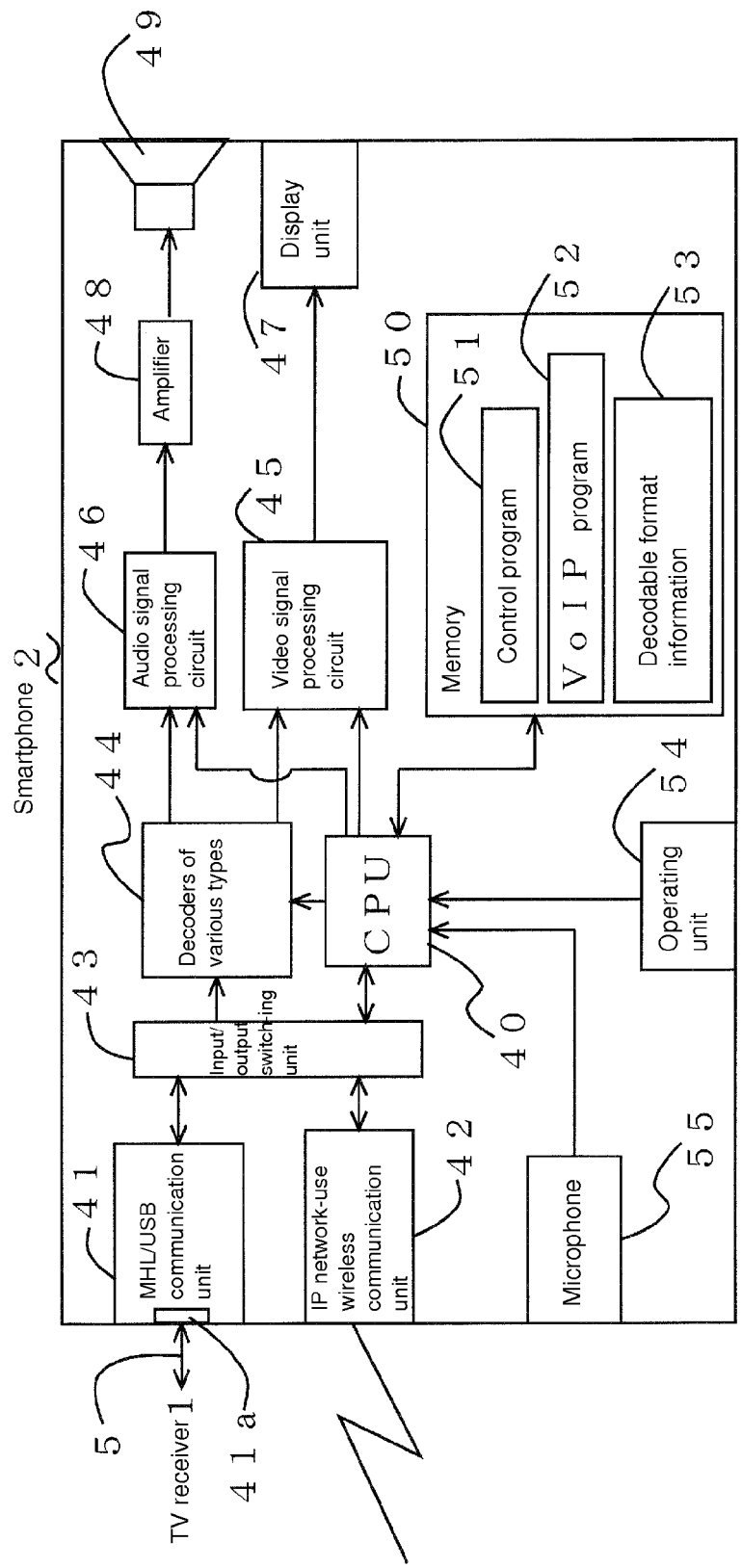
FIG. 3 is an electrical block configuration diagram of the smartphone shown in FIG. 1.

Next, the electrical block configuration of the smartphone 2 will be described with reference to FIG. 3. The smartphone 2 includes a CPU 40 that controls the device overall. The smartphone 2 includes an MHL/USB communication unit 41 which is an interface circuit having both the function of performing communications with the TV 1 via the MHL cable 5 in accordance with the MHL standards and the function of performing communications with equipment such as a personal computer via a USB cable (not illustrated) in accordance with the USB standards. The MHL/USB communication unit 41 is provided with a micro-USB connector 41a. In addition, the smartphone 2 includes an IP (internet protocol) network-use wireless communication unit 42 that performs wireless communications with IP networks.

Furthermore, the smartphone 2 also preferably includes an input/output switching unit 43, decoders 44 of various types, a video signal processing circuit 45, an audio signal processing circuit 46, a display unit 47, an amplifier 48, and a speaker 49. The input/output switching unit 43 sends the data of a multimedia file that is output from the MHL/USB communication unit 41 and the IP network-use wireless communication unit 42 to the decoders 44 of various types in accordance with the control performed by the CPU 40. The decoders 44 of various types include decoders that decode the data of a multimedia file to store compressed moving image data such as MP4 (MPEG-4 unit 14), WMV (Windows media video), and AVI (audio video interleaving) and a decoder that decodes the data of a multimedia file to store compressed audio data such as MP3 (MPEG audio layer-3).

The decoders 44 of various types generate a video signal and an audio signal by decoding the data of the multimedia file. Then, the decoders 44 of various types normally transmit the generated video signal and audio signal to the video signal processing circuit 45 and the audio signal processing circuit 46. In contrast to this, when a decoding request command to request that the data of a multimedia file be decoded is received together with the data of the multimedia file from the TV 1, the decoders 44 of various types transmit a video signal and an audio signal generated on the basis of the data of the multimedia file to the TV 1 via the input/output switching unit 43 by using the MHL/USB communication unit 41 in accordance with the control performed by the CPU 40.

The video signal processing circuit 45 subjects the video signal that is input from the decoders 44 of various types to various types of processing such as image processing and outputs the video signal that has undergone such processing to the display unit 47. The display unit 47 displays video on the basis of the video signal that has been processed by the video signal processing circuit 45.

The audio signal processing circuit 46 subjects the audio signal that is input from the decoders 44 of various types to various types of audio signal processing (including D/A conversion processing when the input audio signal is a digital-form audio signal) and outputs to the amplifier 48 the audio signal that has undergone such processing. The amplifier 48 amplifies the audio signal that is output from the audio signal processing circuit 46 and sends the signal to the speaker 49. The speaker 49 is driven by the audio signal amplified by the amplifier 48 and outputs audio.

Moreover, the smartphone 2 includes a memory 50 arranged to store data and various types of programs including a control program 51 that controls the smartphone 2 overall, a VoIP (voice over IP) program 52, and decodable format information 53. The VoIP program 52 is a program that performs communications (audio communications) with another phone via an IP network. The CPU 40 executes processing which compresses and packetizes the audio signal data sent from a microphone 55 and processing which decodes packet data sent from the IP network-use wireless communication unit 42 and returns it to an audio signal on the basis of the VoIP program 52. The decodable format information 53 is information indicating the types of data format that can be decoded by a decoder of the smartphone 2. The microphone 55 is used to input audio during audio communications or the like by the user. In addition, the smartphone 2 includes an operating unit 54 used for various types of command operations.

Figure 4:
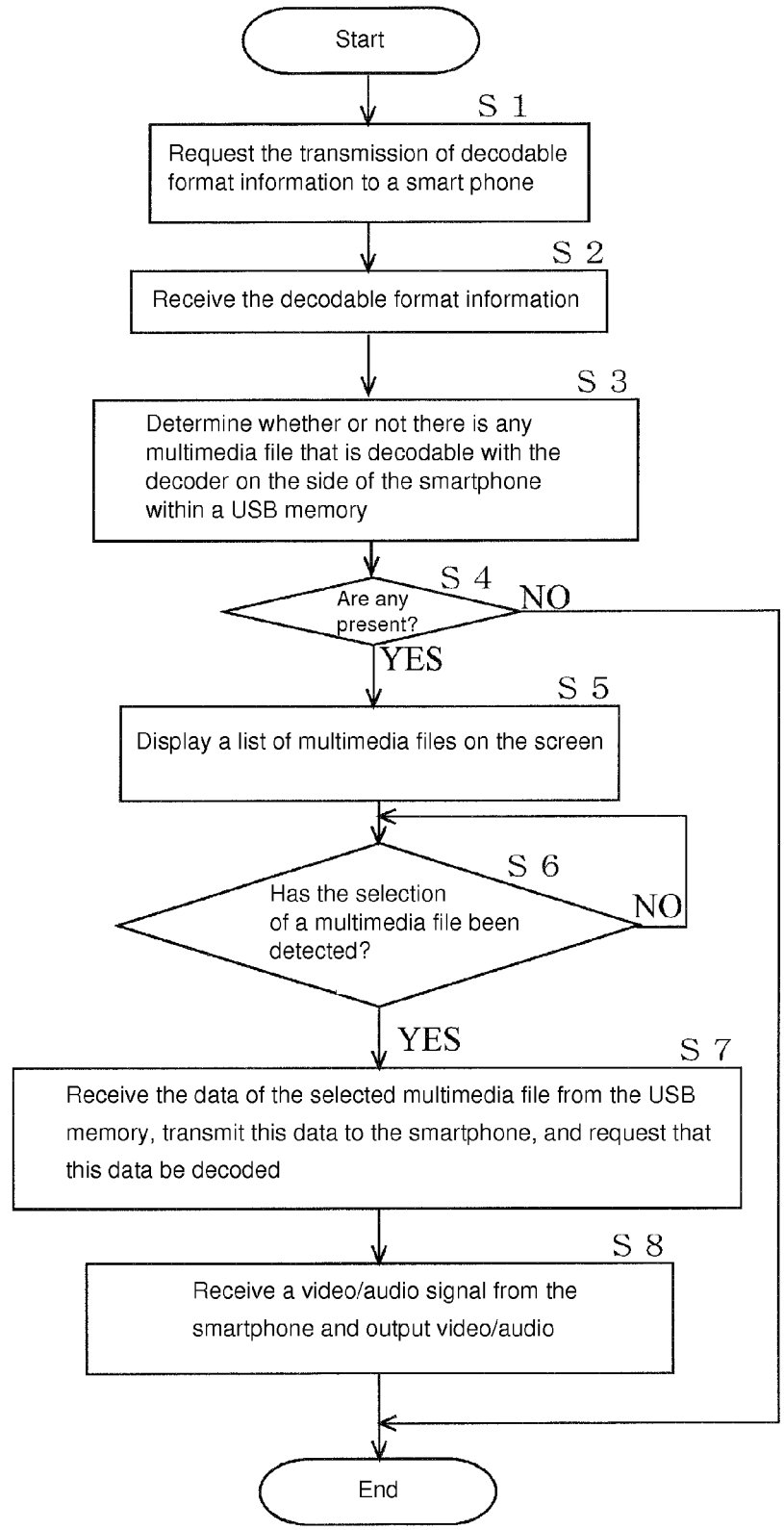
FIG. 4 is a flowchart of processing of a decoding request to the smartphone in the television shown in FIG. 1.

Next, decoding request processing to the smartphone 2 which is performed by the TV 1 will be described with reference to the flowchart of FIG. 4 in addition to the FIGS. 1 through 3. Note that in the flowchart of FIG. 4, the CPU 11 of the TV 1 executes the following various types of processing in accordance with the control program 23, and that the CPU 40 of the smartphone 2 executes the following various types of processing in accordance with the control program 51.

Now, as is shown in FIG. 1, it is assumed that the USB memory 3 which stores the data of multimedia files in the data formats such as MP4, WMV, AVI, and MP3 is connected to (the USB connector 14a of) the TV 1 equipped only with the MPEG-2 decoder 13 as the decoder, and also that the smartphone 2 (equipped with the decoders 44 of various types) having the function of decoding the data of the multimedia files in the data formats such as MP4, WMV, AVI, and MP3 is connected to (the HDMI connector 15a) the TV 1 via the MHL cable 5 as described above.

At this point, in cases where the CPU 11 of the TV 1 determines whether or not the data of the multimedia files 31 stored on the USB memory 3 is decodable with the MPEG-2 decoder 13 and determines the data to be decodable, the CPU 11 uses the USB interface 14 to receive the data of the multimedia files 31 stored on the USB memory 3 and decodes the data of the received multimedia files 31 with the MPEG-2 decoder 13. Then, the CPU 11 of the TV 1 outputs video and audio based on the video stream and audio stream generated by the MPEG-2 decoder 13 to the display unit (e.g., liquid crystal display panel) 6 and the speaker 21.

On the other hand, in cases where the data of the multimedia files 31 stored on the USB memory 3 is determined to be undecodable with the MPEG-2 decoder 13, the CPU 11 of the TV requests to the smartphone 2 that it transmit the decodable format information 53 (S1). When the smartphone 2 transmits the decodable format information 53 in response to this request, the CPU 11 of the TV 1 receives the transmitted decodable format information 53 (S2) and determines whether or not the USB memory contains (stores) any multimedia file 31 that is decodable with a decoder (decoders 44 of various types) of the smartphone 2 on the basis of the decodable format information 53 (S3). In concrete terms, for all of the multimedia files 31 stored on the USB memory 3, the CPU 11 of the TV 1 repeats the determination of whether or not the data of each of the multimedia files 31 is decodable with the decoders 44 of various types of the smartphone 2.

In cases where the USB memory 3 contains any multimedia file(s) 31 decodable with the decoders 44 of various types 4 of the smartphone 2 as a result of the determination (YES in S4), the CPU 11 of the TV 1 displays on the display unit (e.g., liquid crystal display panel) 6 a list of only the multimedia file(s) 31 storing the data that has been determined to be decodable in the determination of the multimedia files 31 stored on the USB memory 3 (S5) and prompts to the user to select a multimedia file 31 which will become the object of reproduction by the use of the cross keys 9 on the remote controller 8. Specifically, as is shown in FIG. 5, the CPU 11 of the TV 1 displays on the display unit (e.g., liquid crystal display panel) 6 a multimedia file list screen 60 which displays the file names (Files 1 through 4 and the like) of the respective multimedia files 31 that are decodable with the decoders 44 of various types and the data format types (MP4, WMV, AVI, MP3, and the like) of such Files 1 through 4 and the like.

When the user selects a multimedia file 31 to be reproduced from among the multimedia files 31 (Files 1 through 4 and the like) displayed on the multimedia file list screen 60 by using the cross keys 9 on the remote controller 8, the CPU 11 of the TV 1 detects this selection (operation) (YES in S6) and receives the data of the selected multimedia file 31 from the USB memory 3 by using the USB interface 14, and the CPU 11 also transmits the data of the received multimedia file 31 to the smartphone 2 and makes a decoding request (S7). That is, the CPU 11 uses the MHL/HDMI communication unit 15 to transmit to the smartphone 2 the data of the multimedia file 31 received from the USB memory 3 and a decoding request command to request the data of this multimedia file 31 to be decoded.

The transmission of the data of the multimedia file 31 and the decoding request command to the smartphone 2 is performed by the MHL/HDMI communication unit 15 in a communication format in accordance with the MHL standards. Then, not only the transmission of the decoding request command, but the transmission of the data of the multimedia file 31 is also performed via a control line (control signal transmission line) in the MHL cable 5. To state this in more concrete terms, the MHL/HDMI communication unit 15 transmits from the TV 1 to the smartphone 2 via the control line of the MHL cable 5 the entire data of the multimedia file 31 by dividing and storing the data of the multimedia file 31 in the region of a scratchpad in a data transmission command and repeatedly transmitting to the smartphone 2 the data transmission command with which this divided data is stored.

When the CPU 40 of the smartphone 2 uses the MHL/USB communication unit 41 to transmit to the TV 1 the video signal and audio signal obtained by decoding the data of the multimedia file 31 received from the TV 1 with the use of the decoders 44 of various types in response to the request in S7, the CPU 11 of the TV 1 uses the MHL/HDMI communication unit 15 to receive the video signal and audio signal from the smartphone 2, displays video on the display unit (e.g., liquid crystal display panel) 6 on the basis of the received video signal, and outputs audio to the speaker 21 on the basis of the received audio signal (S8).

Note that in cases where the data of the multimedia file 31 received from the TV 1 is the data of a multimedia file to store compressed audio data such as MP3, the signal obtained as a result of the CPU 40 of the smartphone 2 using the decoders 44 of various types to decode the data of the multimedia file 31 is only an audio signal. Accordingly, the signal transmitted to the TV 1 by the CPU 40 of the smartphone 2 is also only an audio signal. Furthermore, in cases where the data of the multimedia file 31 received from the TV 1 is the data of a multimedia file to store compressed video data which does not include audio data, the signal obtained as a result of the CPU 40 of the smartphone 2 using the decoders 44 of various types to decode the data of the multimedia file 31 is only a video signal. Accordingly, the signal transmitted to the TV 1 by the CPU 40 of the smartphone 2 is also only a video signal.

As was described above, with the TV 1 of the present preferred embodiment, even in cases where the TV 1 itself does not possess a decoder which can decode the data of the multimedia file 31 selected by the user from among the multimedia files 31 stored on the USB memory 3, it is possible to transmit to the smartphone 2 the data of the selected multimedia file 31 and a decoding request command to request that the data be decoded and to receive the video signal and/or audio signal obtained by the decoders 44 of various types of the smartphone 2, so video and/or audio based on the data of the selected multimedia file 31 can be output to the display unit (e.g., liquid crystal display panel) 6 and the speaker 21. This eliminates the need to mount decoders of many types on the TV 1 itself in order to handle multimedia files in many types of data format which may possibly be stored on the USB memory 3, so the cost required for mounting decoders, including license fees, can be reduced.

Moreover, with the TV 1 of the present preferred embodiment, the user can select only those multimedia files storing data that are decodable with the decoders 44 of various types of the smartphone 2 out of the multimedia files 31 stored on the USB memory 3 by using the cross keys 9 on the remote controller 8, so it is possible to prevent the user from selecting a multimedia file storing data that is not decodable with the decoders 44 of various types of the smartphone 2.

In addition, with the TV 1 of the present preferred embodiment, the determination of whether or not the data of the multimedia files 31 stored on the USB memory 3 is decodable with the decoders 44 of various types of the smartphone 2 is based on the decodable format information transmitted from the smartphone 2. Therefore, it is possible to accurately determine whether or not the data of the multimedia files 31 stored on the USB memory 3 is decodable with the decoders 44 of various types of the smartphone 2.

Furthermore, with the TV 1 of the present preferred embodiment, it is possible to display only the multimedia files storing data that is decodable with the decoders 44 of various types of the smartphone 2 out of the multimedia files 31 stored on the USB memory 3 and to prompt to the user to select a multimedia file 31 which will become the object of reproduction. Therefore, it is possible to more reliably prevent the user from selecting a multimedia file storing data that is not decodable with the decoders 44 of various types of the smartphone 2.

Next, the TV 1 according to a second preferred embodiment of the present invention will be described with reference to FIG. 6. In the TV 1 of the first preferred embodiment, only the multimedia files 31 storing data that is determined to be decodable with the decoders 44 of various types of the smartphone 2 are displayed in a list out of the multimedia files 31 stored on the USB memory 3. In contrast to this, in the TV 1 of the second preferred embodiment, the multimedia files 31 storing data that is determined to be decodable with the decoders 44 of various types of the smartphone 2 out of the multimedia files 31 stored on the USB memory 3 are displayed in a normal manner so as to be in a selectable state, but the multimedia files 31 storing data that is determined to be undecodable are converted to a grayed-out state. Here, the grayed-out state indicates a state in which the files are displayed in a light gray color and are unselectable.

To describe this with a concrete example, it is assumed that the decoders 44 of various types of the smartphone 2 possess the function of decoding the data of the multimedia files 31 in the WMV and MP3 data formats and do not possess the function of decoding the data of the multimedia files 31 in the MP4 and AVI data formats. At this time, if it is assumed that the files that are the same as the multimedia files shown in FIG. (Files 1 through 4 and the like) are stored on the USB memory 3, then as is shown in the multimedia file list screen 60' of FIG. 6, the CPU 11 of the TV 1 places in a selectable state by displaying in a normal manner the multimedia files 31 storing the data which has been determined to be decodable with the decoders 44 of various types of the smartphone 2 (File 1, File 3, and the like) out of the multimedia files 31 stored on the USB memory 3, but places the multimedia files 31 storing the data which has been determined to be undecodable with the decoders 44 of various types of the smartphone 2 (File 2, File 4, and the like) in a grayed-out state so as to be unselectable. Accordingly, the user selects a multimedia file 31 to be reproduced from among the multimedia files 31 displayed in a normal manner (File 1, File 3, and the like) in the multimedia file list screen 60'. Note that the configuration of the TV 1 according to the second preferred embodiment and processing other than the above-described processing are the same as those of the TV 1 of the first preferred embodiment.

Note that the present invention is not limited to the configurations of the above-described preferred embodiments, and various modifications are possible within the scope that does not alter the gist of the present invention. For instance, in the above-described preferred embodiments, an example was shown in which the portable information terminal corresponds to the smartphone 2, but the portable information terminal is not limited to this, and a so-called PDA (personal digital assistant), for example, is also possible. Moreover, in the above-described preferred embodiments, an example was shown in which the storage medium corresponds to the USB memory 3, but the storage medium is not limited to this, and a memory card such as an SD memory card, for example, is also possible. In addition, the interface used in the communications between the TV and the smartphone is not limited to MHL and may also be an interface for wired communications such as HDMI or may also be an interface for wireless communications.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A television which can be connected to a information terminal and which comprises:
   an information terminal data transmission and reception unit arranged to perform transmission and reception of data with the information terminal;
   a storage medium data reception unit arranged to receive data from a storage medium;
   a display unit arranged to display video based on a video signal received from the information terminal by the information terminal data transmission and reception unit;
   a speaker which outputs audio based on an audio signal received from the information terminal by the information terminal data transmission and reception unit;
   a determination unit housed within the television and arranged to determine whether or not the data of multimedia files stored on the storage medium is decodable with a decoder housed within the information terminal;
   a selection controller housed within the television and arranged to select a multimedia file which will become an object of reproduction from among the multimedia files storing data which the determination unit has determined to be decodable by the decoder of the information terminal;
   a multimedia file transmission and reception control unit arranged and programmed to receive the data of the multimedia file selected by the user with the use of the selection controller from the storage medium by using the storage medium data reception unit and to transmit the data of the received multimedia file and a decoding request command to request the decoding of the data of the multimedia file to the information terminal by using the information terminal data transmission and reception unit; and
   a signal reception control unit arranged and programmed to receive a video signal and/or an audio signal obtained as a result of the decoder of the information terminal decoding the data of the multimedia file from the information terminal by using the information terminal data transmission and reception unit; wherein
   the television uses the selection controller to request that the information terminal use the decoder to decode the data of multimedia files stored on the storage medium which the determination unit has determined to be decodable by the decoder of the information terminal.

2. The television according to claim 1, wherein the determination unit requests to the information terminal transmission of decodable format information indicating data format types that are decodable with the decoder of the information terminal and determines whether or not the data of the multimedia files stored on the storage medium is decodable with the decoder of the information terminal on the basis of the decodable format information transmitted from the information terminal in response to the request.

3. The television according to claim 1, further comprising a selection prompt controller arranged to prompt the user to select a multimedia file which will become the object of reproduction by using the selection controller and displaying on the display unit only the multimedia files storing the data which has been determined to be decodable by the determination unit out of the multimedia files stored on the storage unit.

4. The television according to claim 1, wherein the storage unit includes a portable memory.

* * * * *